UNITED STATES PATENT OFFICE.

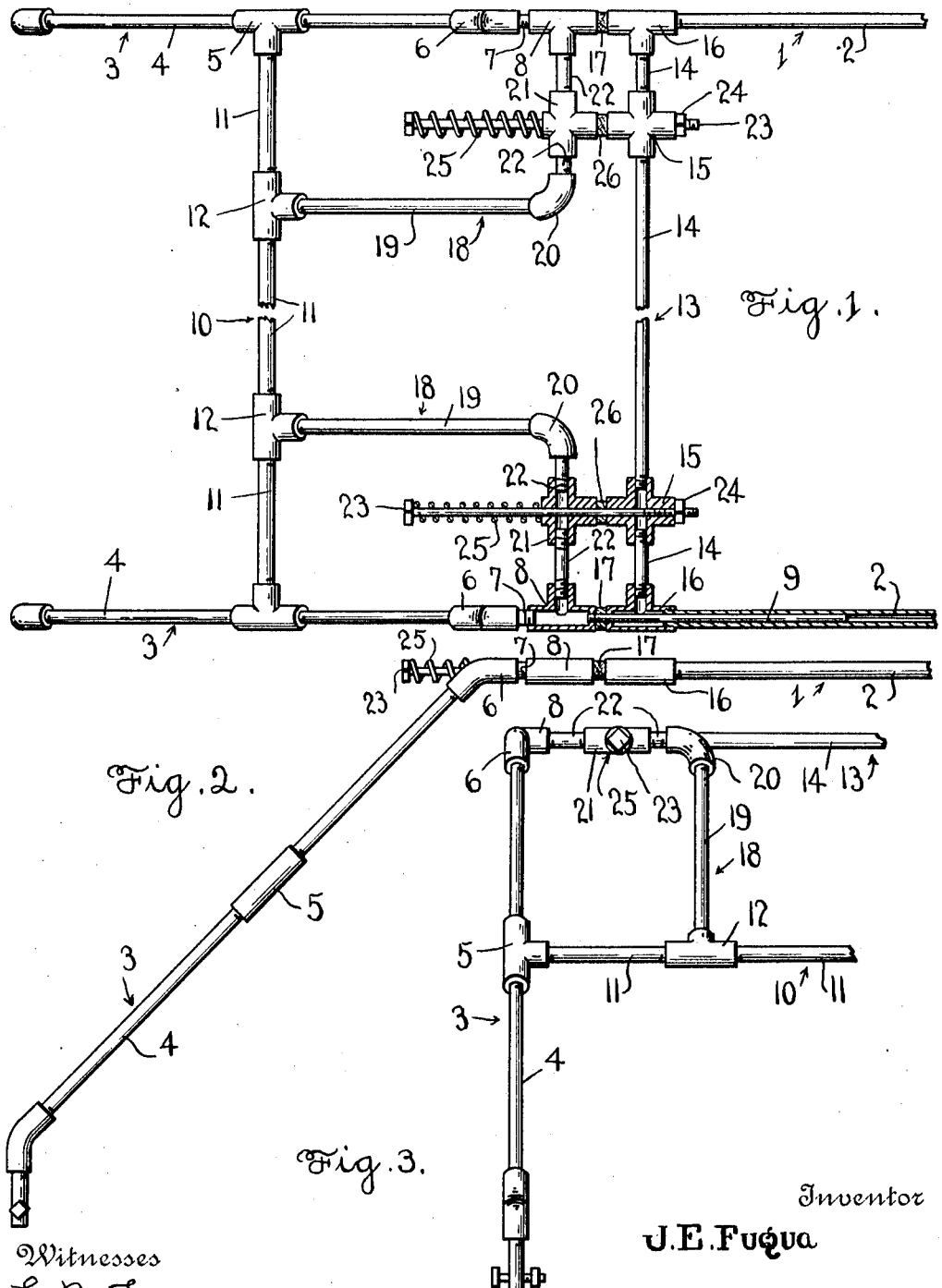

JAMES EVAN FUQUA, OF MONTEVALLO, MISSOURI.

VEHICLE-SHAFT.

1,034,994.  Specification of Letters Patent.  Patented Aug. 6, 1912.

Application filed November 13, 1911. Serial No. 660,005.

*To all whom it may concern:*

Be it known that I, JAMES EVAN FUQUA, a citizen of the United States, residing at Montevallo, in the county of Vernon and State of Missouri, have invented certain new and useful Improvements in Vehicle-Shafts; and I do declare the following to be a full, clear, and exact description of the invention, such as will enable others skilled in the art to which it appertains to make and use the same.

This invention relates to improvements in vehicle shafts.

One object of the invention is to provide a pair of vehicle shafts or thills formed in yieldingly connected sections whereby all jerking or jars due to the sudden starting of the draft animal will be obviated and prevented from being applied to the vehicle, and whereby a yielding or resilient draft is provided.

Another object is to provide a pair of shafts formed of a series of tubular sections threaded at their ends and connected together by threaded couplings whereby a light, strong and durable structure is formed.

With these and other objects in view the invention consists of certain novel features of construction, and the combination and arrangement of parts as will be more fully described and claimed.

In the accompanying drawings; Figure 1 is a top plan view of my improved shafts, parts being broken away and in section; Fig. 2 is a side view thereof; Fig. 3 is a rear or inner end view of the same.

Referring more particularly to the drawings, 1 denotes the side bars of the shafts, said bars comprising main tubular outer members 2 between which the draft animal is hitched, and inner shaft attaching members 3 which are arranged at an angle of substantially 45° to the main members and are adapted to be connected at their lower ends to the axle of the vehicle in any suitable manner. The inner members 3 are formed of a plurality of tubular sections 4 threaded at their ends and connected together by T-couplings 5 and having on their ends elbows 6. The elbows 6 at the forward end of the members 3 are connected by short couplings 7 to T-couplings 8 in which are secured the inner ends of supporting rods 9 with which are slidably engaged the inner ends of the outer members 2 of the side bars. The inner members of the side bars are connected together by cross bars 10 comprising a plurality of tubular threaded sections 11 which are connected together by T-couplings 12. The outer ends of the outer sections 11 have a threaded engagement with the T-couplings 5 which connect the sections 4 of the inner members 3 together. The inner ends of the outer members 2 of the side bars are connected together by a cross bar 13 formed of a series of tubular threaded sections 14 which are connected together near the side bars of the shafts by four-way couplings 15 and have their outer ends connected with T-couplings 16 arranged on the inner ends of the outer members 2 of the side bars as shown. On the rods 9 between the couplings 8 and 16 are arranged leather washers 17 which receive the thrust of the rearward movement of the outer members of the side bars when the vehicle is backed.

Secured to the inner members 4 and to the cross bar 10 thereof adjacent to each side of the shafts is a spring holding frame 18, said frames comprising tubular longitudinal sections 19 threaded at their ends and having their rear ends engaged with the T-coupling 12 of the cross bar 10 and having on their outer ends elbows 20. The forward ends of the frames 18 are formed by four-way couplings 22 connected to the elbows 20 on one side and to the T-couplings 8 on the opposite side. Arranged through the four-way couplings 15 of the cross bar 14 are spring supporting bolts 23 having on their forward ends, nuts 24. The rear portion of the bolts 23 are slidably engaged with the four-way couplings 21 of the spring holding frames and have thereon between said couplings and the heads thereof coiled compression springs 25 the pressure of which is exerted to draw the bolts inwardly and thus yieldingly hold the outer members 2 of the side bars into engagement with the inner members 3 thereof, thus forming a yielding resistance against the pole or draft of the vehicle by the draft animal hitched thereto. On the bolts 23 between the four-way couplings 15 of the cross bars 13 and the four-way couplings 21 of the spring holding arms are arranged leather washers 26 which co-act with the washers 17 to receive the rearward thrust of the outer portion of the shafts.

By forming the shafts of yieldingly connected members constructed and arranged as herein shown and described it will be readily seen that the draft animal will be relieved of strain and jerks caused by the wheels of the vehicle becoming clogged or striking obstructions and that the vehicle will be relieved of jerks and shocks due to the sudden starting of the draft animal; furthermore the shafts themselves or the parts comprising the same will also be relieved of strains and jars thus greatly prolonging the life or usefulness of the shafts.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention what I claim is;

1. Vehicle shafts comprising side bars each consisting of inner and outer tubular members, supporting rods secured in one of said members and having a sliding engagement with the other member whereby said members are loosely connected, cross bars connecting said inner and outer members, spring holding frames connected to said inner members, bolts arranged in the cross bars of the outer members and having a sliding engagement with the spring holding frames of the inner members, and springs arranged on said bolts for yieldingly connecting said shaft members.

2. A pair of vehicle shafts comprising side bars, each of which consists of inner and outer tubular members, supporting rods secured in the forward ends of said inner members and having a sliding engagement with the inner ends of the outer members whereby said outer members are loosely engaged with the inner members, cross bars to connect said inner members and said outer members together, spring holding frames connected to said inner members, bolts arranged in the cross bar of the outer member and having a sliding engagement with the spring holding frames of the inner member and springs arranged on said bolts whereby said members of the shafts are yieldingly connected together.

3. A pair of vehicle shafts comprising side bars, each of which consists of inner and outer members formed of a plurality of tubular threaded sections, coupling members to secure said sections together, supporting rods secured in the outer ends of the inner members and having a sliding engagement with the tubular inner ends of the outer members of the side bars, a cross bar to connect the inner members of the side bars together, a cross bar to connect the outer members of the side bars together near their inner ends, spring holding frames connected to the inner members of the side bars and to the cross bar thereof, said frames comprising a series of tubular sections, coupling members to connect said sections together, spring holding bolts arranged through the coupling members of the cross bar of the outer members of the side bars and having a sliding engagement with the coupling members of said spring holding frames, heads arranged on the inner ends of said bolts, nuts engaged with the outer ends thereof, springs arranged on said bolts between said heads and the coupling members of the spring holding frames whereby the outer members of the side bars are held in yielding engagement with the inner members of the side bars.

In testimony whereof I have hereunto set my hand in presence of two subscribing witnesses.

JAMES EVAN FUQUA.

Witnesses:
 JNO. W. STUESMER,
 W. R. MANN.

---

Copies of this patent may be obtained for five cents each, by addressing the "Commissioner of Patents, Washington, D. C."